United States Patent
Kim et al.

(10) Patent No.: US 9,252,844 B2
(45) Date of Patent: Feb. 2, 2016

(54) RESONANCE POWER GENERATOR AND RESONANCE POWER RECEIVER FOR PERFORMING DATA COMMUNICATION

(75) Inventors: Nam Yun Kim, Seoul (KR); Sang Wook Kown, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 12/969,312

(22) Filed: Dec. 15, 2010

(65) Prior Publication Data

US 2011/0159812 A1    Jun. 30, 2011

(30) Foreign Application Priority Data

Dec. 29, 2009    (KR) .................. 10-2009-0133298

(51) Int. Cl.
*H04B 5/00* (2006.01)
*H02J 5/00* (2006.01)

(52) U.S. Cl.
CPC .............. *H04B 5/0031* (2013.01); *H02J 5/005* (2013.01); *H04B 5/0037* (2013.01)

(58) Field of Classification Search
None
See application file for complete search history.

(56) References Cited

U.S. PATENT DOCUMENTS

| | | | | |
|---|---|---|---|---|
| 5,802,463 A | * | 9/1998 | Zuckerman | 455/208 |
| 6,147,605 A | * | 11/2000 | Vega et al. | 340/572.7 |
| 6,424,682 B1 | * | 7/2002 | Enguent et al. | 375/308 |
| 2005/0156742 A1 | * | 7/2005 | Fujii | 340/572.7 |
| 2006/0029018 A1 | * | 2/2006 | Mizukami et al. | 370/328 |
| 2006/0049918 A1 | * | 3/2006 | Takiguchi | 340/10.4 |
| 2008/0318524 A1 | * | 12/2008 | Rofougaran | 455/41.1 |
| 2009/0137219 A1 | * | 5/2009 | Williams | 455/214 |
| 2010/0190436 A1 | * | 7/2010 | Cook et al. | 455/41.1 |
| 2011/0053503 A1 | * | 3/2011 | Witschnig et al. | 455/41.1 |
| 2012/0028574 A1 | * | 2/2012 | Bangs et al. | 455/41.1 |

FOREIGN PATENT DOCUMENTS

| | | |
|---|---|---|
| JP | 2005-252487 | 9/2005 |
| JP | 2008-227935 | 9/2008 |
| KR | 10-2004-0039240 | 5/2004 |
| KR | 10-2006-0081736 | 7/2006 |
| KR | 10-2008-0093746 | 10/2008 |
| KR | 10-2008-0113018 | 12/2008 |

\* cited by examiner

*Primary Examiner* — Alejandro Rivero
(74) *Attorney, Agent, or Firm* — NSIP Law

(57) ABSTRACT

Disclosed is a resonate power generator and a resonate power receiver. The resonate power generator may include a modulator to control modulation of transmission data transmitted to a target resonator, and to control transmission of the modulated transmission data to a power carrier signal of a source resonator, a demodulator to demodulate received data received from the target resonator, and a coupling unit to couple the modulator, the demodulator, and the source resonator.

11 Claims, 16 Drawing Sheets

$$W_{MZR} = \frac{1}{\sqrt{L_R C_L}}$$

RESONANCE POWER GENERATOR AND
RESONANCE POWER RECEIVER FOR
PERFORMING DATA COMMUNICATION

CROSS-REFERENCE TO RELATED
APPLICATION(S)

This application claims the benefit under 35 U.S.C. §119 (a) of Korean Patent Application No. 10-2009-0133298, filed on Dec. 29, 2009, in the Korean Intellectual Property Office, the entire disclosure of which is incorporated herein by reference for all purposes.

BACKGROUND

1. Field

The following description relates to a resonate power generator and a resonate power receiver, and more particularly, to a resonate power generator and a resonate power receiver that may include a modulator and a demodulator, and thus the resonate power generator and the resonate power receiver may communicate in a resonate power transmission system.

2. Description of Related Art

With the development of Information Technology (IT), a variety of portable electronic devices have been released, and distribution of the portable electronic devices has also increased. Due to various characteristics of the portable electronic devices, battery performance of a corresponding portable electronic device is becoming an issue. In addition to the portable electronic devices, various home electronic appliances have a function of wirelessly transmitting data and can be supplied with power over a power line.

Recently, research has been conducted on wireless power transmission technology that may wirelessly supply power. A wireless power transmission system may transmit a large output signal using a power amplifier, and thus attention is being paid to a method of increasing power efficiency. Improving a power transmission efficiency may be physically limited due to characteristics of the wireless power transmission technology, and thus it may be beneficial that a resonate power generator and a resonate power receiver communicate to exchange information associated with a power transmission time and a power transmission strength.

There is a desire for a method of modulating desired information to transmit the modulated information to a wireless power signal transmitted by the resonate power generator and the resonate power receiver, and a method of decoding the modulated information.

SUMMARY

In one general aspect, there is provided a resonate power generator, including a modulator to control modulation of transmission data transmitted to a target resonator and to control transmission of the modulated transmission data to a power carrier signal of a source resonator, a demodulator to demodulate received data received from the target resonator, and a coupling unit to couple the modulator, the demodulator, and the source resonator.

The demodulator may include a mixer to mix the received data and the power carrier signal, and a switching unit to switch a reception path of the received data and a transmission path of the power carrier signal. The resonate power generator may analog to digital (A/D) convert an output signal of the mixer to read a bit value transmitted from the target resonator.

The demodulator may include an envelope detector to detect an envelope of the received data. The resonate power generator may compare an output signal of the envelope detector and the power carrier signal to read a bit value transmitted from the target resonator.

The modulator may include a switching unit to switch the power carrier signal based on a bit stream corresponding to the transmission data.

The modulator may include a phase control-unit to shift a phase of the power carrier signal, and a mixer to mix an output of the phase control unit and a bit stream corresponding to the transmission data.

In another general aspect, there is provided a resonate power receiver, including a modulator to control modulation of transmission data transmitted to a source resonator and to control transmission of the modulated transmission data to a power carrier signal, a demodulator to demodulate received data received from the source resonator, and a coupling unit to couple the modulator, the demodulator, and the target resonator.

The demodulator may include a mixer to mix the received data and the power carrier signal, and a switching unit to switch a reception path of the received data and a transmission path of the power carrier signal. The resonate power generator may analog to digital (A/D) convert an output signal of the mixer to read a bit value transmitted from the source resonator.

The demodulator may include an envelope detector to detect an envelope of the received data. The resonate power generator may compare an output signal of the envelope detector and the power carrier signal to read a bit value transmitted from the source resonator.

The modulator may include a switching unit to switch the power carrier signal based on a bit stream corresponding to the transmission data.

The modulator may include a phase control unit to shift a phase of the power carrier signal, and a mixer to mix an output of the phase control unit and a bit stream corresponding to the transmission data.

In another general aspect, there is provided a resonate power generator, including a modulator to modulate a power carrier signal according to an input transmission data bit stream to send outgoing data to a target resonator, and a demodulator to demodulate incoming data received from the target resonator.

The resonate power generator may further include a source resonator to transmit the outgoing data to the target resonator, and a coupling unit to couple the modulator, demodulator, and source resonator.

The resonate power generator may further include a controller to control input of the input transmission data bit stream to the modulator.

The demodulated incoming data may be sent to the controller to be used in a predetermined operation.

Other features and aspects may be apparent from the following detailed description, the drawings, and the claims.

Figure 1:
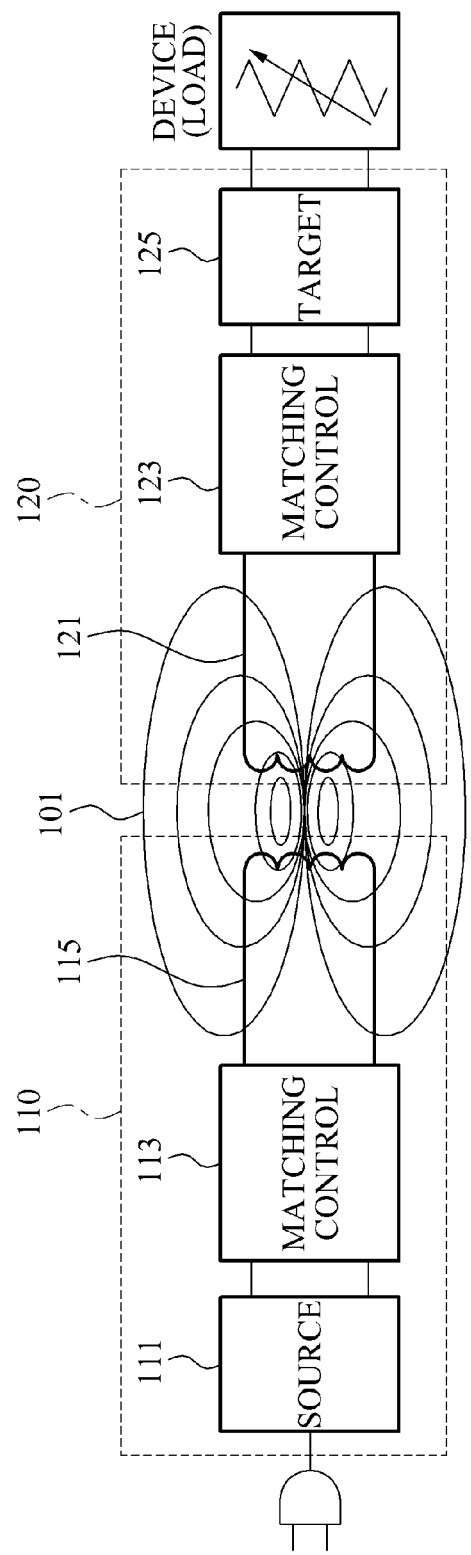
FIG. 1 is a diagram illustrating an example of a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing operations described is an example; however, the sequence of operations is not limited to that set forth herein and may be changed as is known in the art, with the exception of operations necessarily occurring in a certain order. Also, descriptions of well-known functions and constructions may be omitted for increased clarity and conciseness.

FIG. 1 illustrates an example of a wireless power transmission system.

In this example, wireless power transmitted using the wireless power transmission system may be assumed to be resonance power.

Referring to FIG. 1, the wireless power transmission system may have a source-target structure including a source and a target. The wireless power transmission system may include a resonance power transmitter 110 corresponding to the source and a resonance power receiver 120 corresponding to the target.

The resonance power transmitter 110 may include a source unit 111 and a source resonator 115. The source unit 111 may receive energy from an external voltage supplier to generate a resonance power. The resonance power transmitter 110 may further include a matching control 113 to perform resonance frequency or impedance matching.

The source unit 111 may include an alternating current (AC)-to-AC (AC/AC) converter, an AC-to-direct current (DC) (AC/DC) converter, and/or a DC-to-AC (DC/AC) inverter. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal in a band of a few megahertz (MHz) to tens of MHz by quickly switching a DC voltage output from the AC/DC converter.

The matching control 113 may set a resonance bandwidth of the source resonator 115 and/or an impedance matching frequency of the source resonator 115. Although not illustrated in FIG. 1, the matching control 113 may include a source resonance bandwidth setting unit and/or a source matching frequency setting unit. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on a setting of the resonance bandwidth of the source resonator 115 or a setting of the impedance matching frequency of the source resonator 115.

The source resonator 115 may transfer electromagnetic energy to a target resonator 121. For example, the source resonator 115 may transfer the resonance power to the resonance power receiver 120 through magnetic coupling 101 with the target resonator 121. The source resonator 115 may resonate within the set resonance bandwidth.

The resonance power receiver 120 may include, for example, the target resonator 121, a matching control 123 to perform resonance frequency and/or impedance matching, and a target unit 125 to transfer the received resonance power to a load.

The target resonator 121 may receive the electromagnetic energy from the source resonator 115. The target resonator 121 may resonate within the set resonance bandwidth.

The matching control 123 may set a resonance bandwidth of the target resonator 121 and/or an impedance matching frequency of the target resonator 121. Although not illustrated in FIG. 1, the matching control 123 may include a target resonance bandwidth setting unit and/or a target matching frequency setting unit. The target resonance bandwidth setting unit may set the resonance bandwidth of the target resonator 121. The target matching frequency setting unit may set the impedance matching frequency of the target resonator 121. Here, a Q-factor of the target resonator 121 may be determined based on a setting of the resonance bandwidth of the target resonator 121 or a setting of the impedance matching frequency of the target resonator 121.

The target unit 125 may transfer the received resonance power to the load. The target unit 125 may include, for example, an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

The source resonator 115 and the target resonator 121 may be configured, for example, in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission employing a resonance scheme, the resonance bandwidth may be an important factor. In an example in which the Q-factor considering a change in a distance between the source resonator 115 and the target resonator 121, a change in the resonance impedance, impedance mismatching, a reflected signal, and the like, is represented by the value Qt, Qt may have an inverse-proportional relationship with the resonance bandwidth, as given by Equation 1.

$$\frac{\Delta f}{f_0} = \frac{1}{Qt}$$ [Equation 1]
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. In the presently described example, the BW-factor may indicate either $1/BW_S$ or $1/BW_D$.

Due to an external effect, for example, a change in the distance between the source resonator 115 and the target resonator 121, a change in a location of the source resonator 115 and/or the target resonator 121, and/or other like changes, impedance mismatching between the source resonator 115 and the target resonator 121 may occur. The impedance mismatching may be a direct cause in decreasing an efficiency of power transfer. In an example in which a reflected wave corresponding to a transmission signal that is partially reflected and returned is detected, the matching control 113 may determine that impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency having a minimum amplitude in the waveform of the reflected wave.

Figure 2:
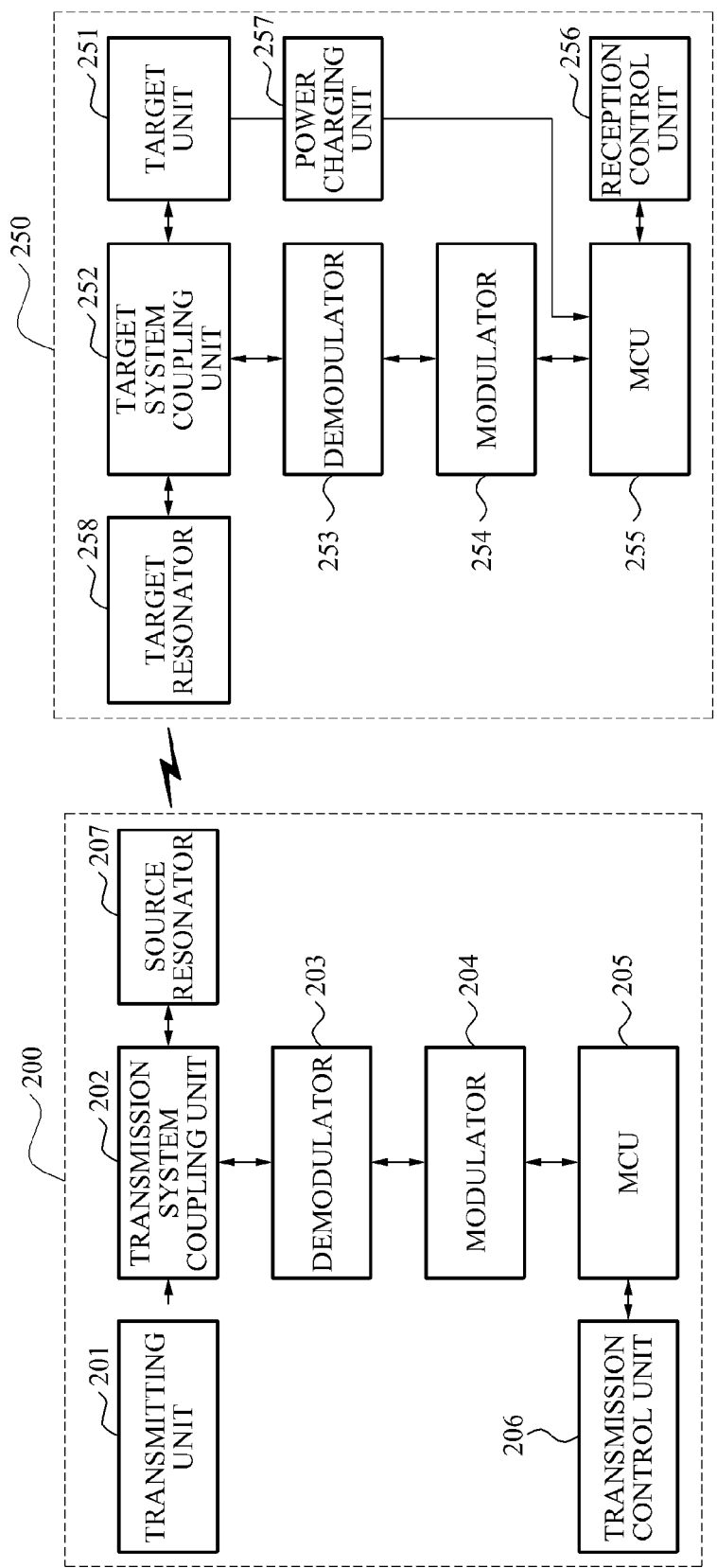
FIG. 2 is a diagram illustrating an example of a resonate power generator and a resonate power receiver.

FIG. 2 illustrates an example of a resonate power generator 200 and a resonate power receiver 250.

The resonate power generator 200 may include a transmitting unit 201, a transmission system coupling unit 202, a demodulator 203, a modulator 204, and a source resonator 207. Referring to FIG. 2, the resonate power generator 200 may further include a main control unit (MCU) 205 and a transmission control unit 206 to control generation and reading of data that is demodulated by the demodulator 203 or modulated by the modulator 204.

The resonate power receiver 250 may include a target unit 251, a target system coupling unit 252, a demodulator 253, a modulator 254, and a target resonator 258. Referring to FIG. 2, the resonate power receiver 250 may further include a power charging unit 257 connected to the target unit 251, and may further include a main control unit (MCU) 255 and a reception control unit 256 to control reading and generation of data that is demodulated by the demodulator 253 or modulated by the modulator 254.

The transmitting unit 201 of the wireless power generator 200 of FIG. 2 may be a module to generate a power signal, and may include a plurality of functional modules to provide power to a predetermined power carrier signal. For example, the wireless power generator 200 may include an RF signal generator (not illustrated) and a plurality of filter units (not illustrated) to generate a wireless power signal to be transmitted through the source resonator 207. The target unit 251 of the wireless power receiver 250 may be a module to provide, using a received power signal, power to a load, such as the power charging unit 257 and the like, and may include a plurality of functional modules to extract power included in the power carrier signal.

The transmitting unit 201 and the target unit 251 may be designed to support a modulating and decoding scheme. However, according to various example embodiments, modules included in a general wireless power transmitter and receiver may be used.

Referring to FIG. 2, a data modulating and decoding method of the resonate power generator 200 and a data modulating and decoding method of the resonate power receiver 250 may be the same or similar in an example embodiment. Accordingly, a data transmission and reception scheme between the resonate power generator 200 and the resonate power receiver 250 will be described with reference to the resonate power generator 200.

Figure 3:
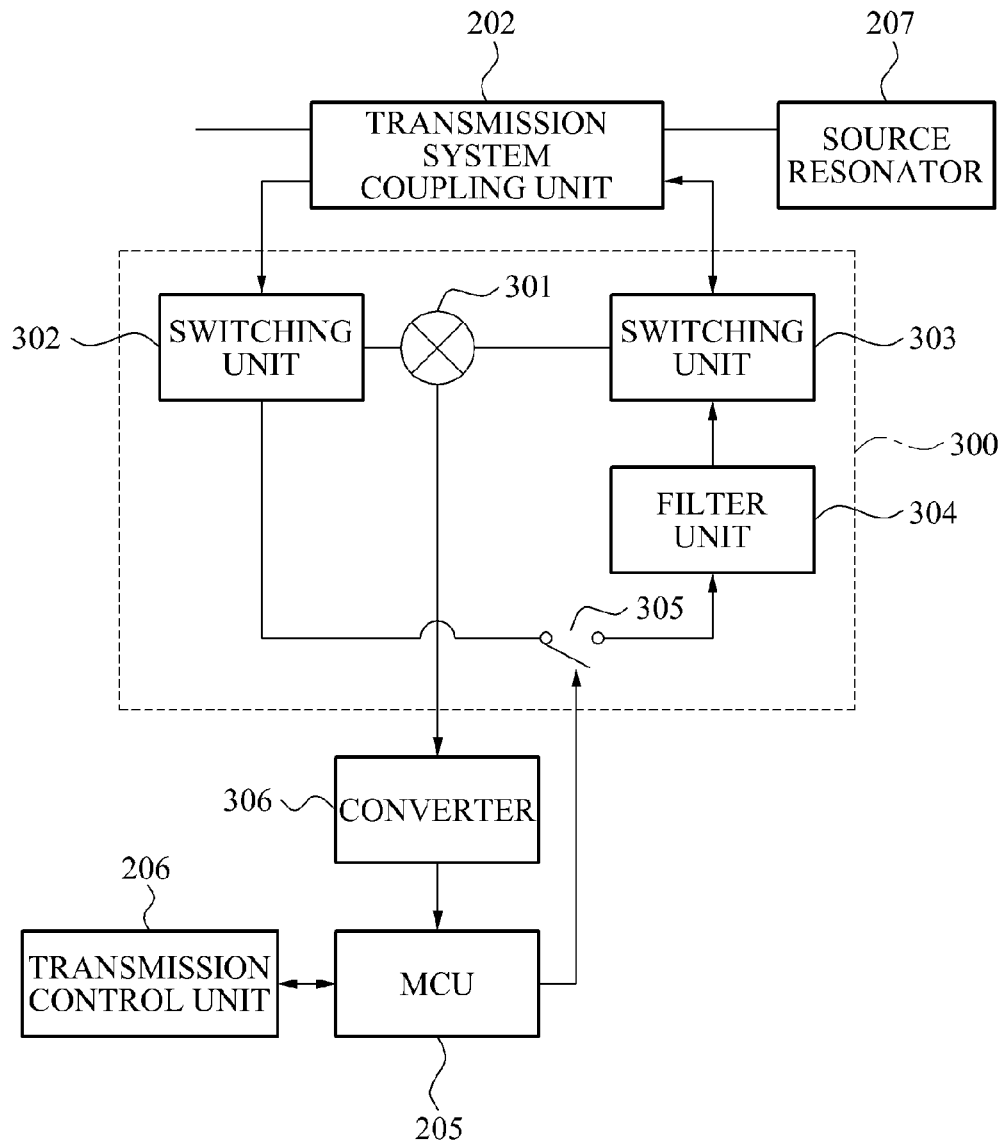
FIG. 3 is a diagram illustrating an example of a modulator and demodulator of a resonate power generator.

FIG. 3 illustrates an example of a modulator and demodulator of the resonate power generator 200 illustrated in FIG. 2.

Referring to FIG. 3, a modulator and demodulator 300 may include switching units 302, 303, and 305, a filter unit 304, and a mixer 301. The modulator and demodulator 300 may represent the demodulator 203 and/or modulator 204 of FIG. 2.

According to an example of a demodulating operation, the switching unit 302 may switch a power carrier signal to be inputted to the mixer 301. Received data, namely, a modulated signal, received through the source resonator 207 may be inputted, through the transmission system coupling unit 202, to the switching unit 303, and the switching unit 303 may switch the received data to be inputted to the mixer 301. The received data and the power carrier signal inputted to mixer 301 may be mixed, and an output signal of the mixer 301 may be inputted to a converter 306. The converter 306 may be, for example, a comparator, an analog-to-digital (A/D) converter, or the like. A bit stream passing through the converter 306 may be transmitted to the control unit 205 and to the transmission control unit 206, and may be used to perform a predetermined operation.

According to an example of a modulating operation, a bit stream corresponding to transmission data to be transmitted to the resonate power receiver 250 may be inputted to the switching unit 305, based on control of the control unit 205 and the transmission control unit 206. The switching unit 302 may switch the power carrier signal to be inputted to the switching unit 305, and the power carrier signal inputted to the switching unit 305 may be modulated to correspond to the bit stream based on a switching operation of the switching unit 305. The modulated signal may be filtered by the filter unit 304, and the switching unit 303 may switch the filtered modulated signal to be inputted, through the power system coupling unit 202 to the source resonator 207.

Figure 4:
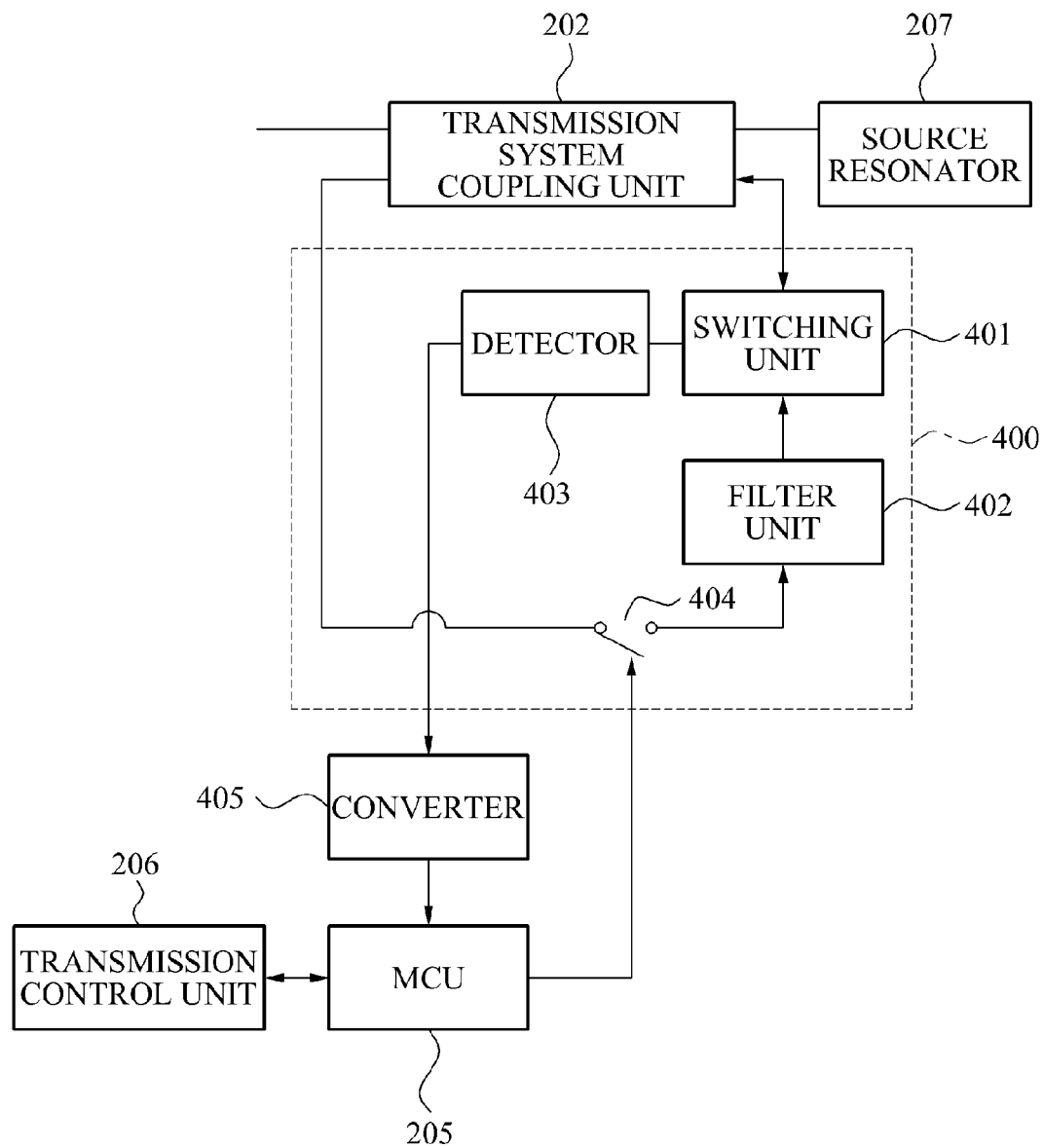
FIG. 4 is a diagram illustrating another example of a modulator and demodulator of a resonate power generator.

FIG. 4 illustrates another example of a modulator and demodulator of a resonate power generator.

Referring to FIG. 4, a modulator and decoder 400 may include switching units 401 and 404, a filter unit 402, and a detector 403. The modulator and demodulator 400 may represent the demodulator 203 and/or modulator 204 of FIG. 2.

According to an example of a demodulating operation, received data received through the source resonator 207 may be inputted through the transmission system coupling unit 202 to the switching unit 401, and the switching unit 401 may control the received data to be inputted to the detector 403. The detector 403 may operate, for example, as an envelope detector. The detector 403 may be embodied by, for example, a diode, a logarithmic amplifier, and the like. The logarithmic amplifier may be used for an application example in which a reception is improved and a quick response is desired. A signal passing through the detector 403 may be inputted to the converter 405, and the converter 405 may compare a reference signal having the same bit rate as a bit rate of the bit stream with the modulated signal passing through the detector 403, and may demodulate the modulated signal.

According to an example of a modulating operation, a bit stream corresponding to transmission data to be transmitted to the resonate power receiver 250 may be inputted to the switching unit 404, based on control of the control unit 205 and the transmission control unit 206. The power carrier signal inputted to the switching unit 404 may be modulated to correspond to the bit stream based on a switching operation of the switching unit 404. The modulated signal may be filtered by the filter unit 402, and the switching unit 401 may switch the filtered modulated signal to be inputted through the power system coupling unit 202 to the source resonator 207.

Figure 5:
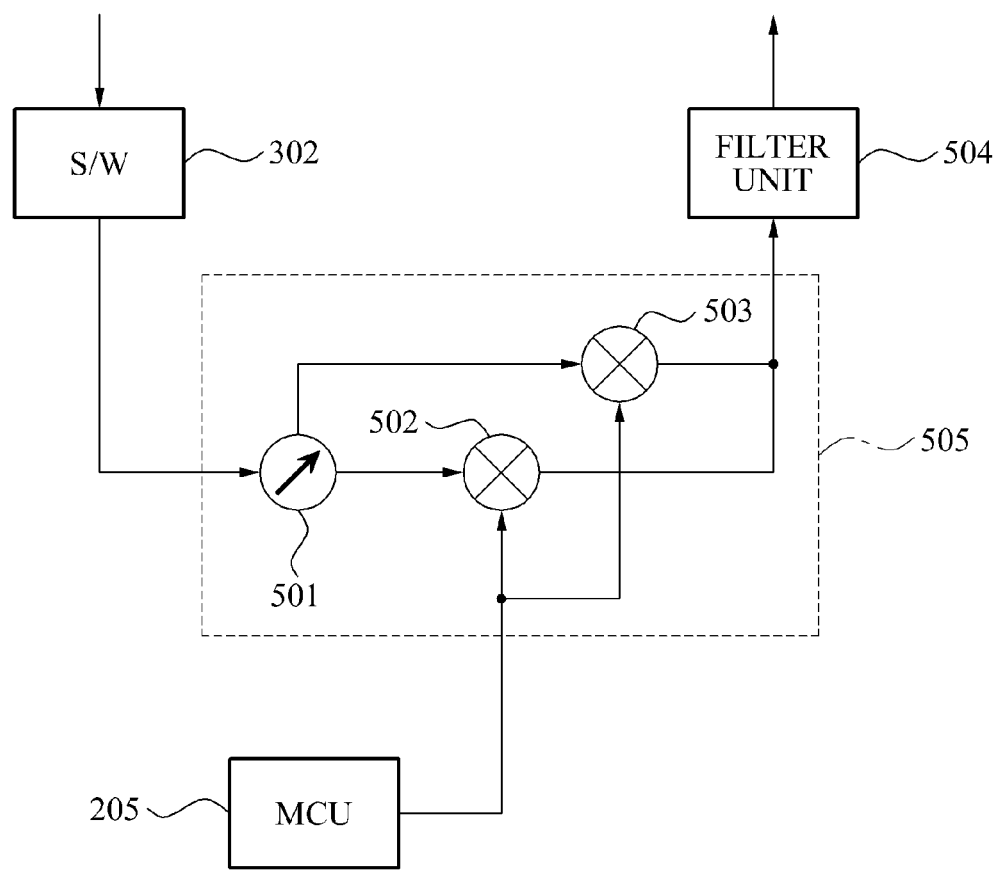
FIG. 5 is a diagram illustrating still another example of a modulator and demodulator of a resonate power generator.

FIG. 5 illustrates still another example of a modulator and demodulator of a resonate power generator.

Referring to FIG. 5, the resonate power generator 200 may modulate transmission data based on a phase shift keying (PSK) scheme.

For example, a bit stream corresponding to transmission data to be transmitted to the resonate power receiver 250 may be inputted to mixers 502 and 503 of modulator 505, based on a control of the control unit 205. The switching unit 302 may switch a power carrier signal to be inputted to a phase control unit 501. The phase control unit 501 may divide an input signal into an I/Q signal having a phase of zero degrees and an I/Q signal having a phase of 180 degrees. The I/Q signals from the phase control unit 501 may be inputted to the mixers 502 and 503, respectively, and may be modulated based on the bit stream corresponding to the transmission data. The modulated signal may be filtered by the filter unit 504, and the filtered modulated signal may be inputted, through the power system coupling unit 202, to the source resonator 207.

Figure 6:
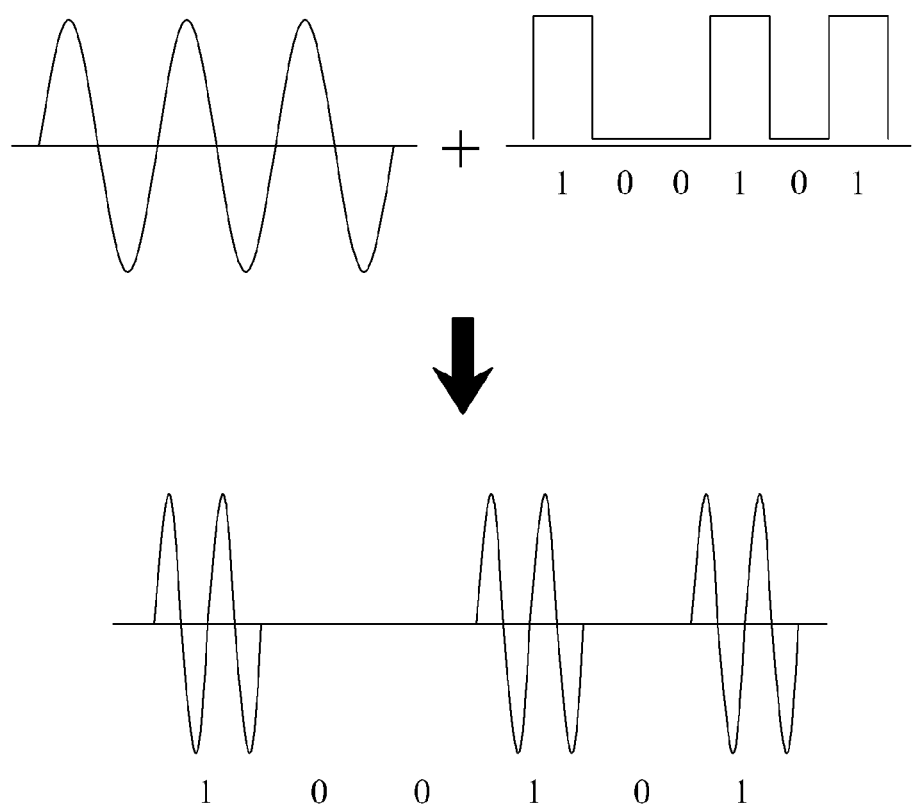
FIG. 6 is a diagram illustrating an example of an output waveform of a modulator of a resonate power generator.

FIG. 6 illustrates an example of an output waveform of a modulator of a resonate power generator.

FIG. 6 illustrates an example of a modulated signal that may be obtained by modulating a bit stream, for example, '100101', based on a switching scheme of FIGS. 3 and 4. The modulated signal may be obtained by switching a power carrier signal based on the bit stream. A modulated signal of FIG. 7 may be demodulated into an original bit stream through the modulator and demodulator 300 of FIG. 3 or the modulator and demodulator 400 of FIG. 4, and the resonate generator 200 or the resonate power receiver 250 that receives the demodulated original bit stream may interpret a bit value of the corresponding bit stream to perform a predetermined operation.

Figure 7:
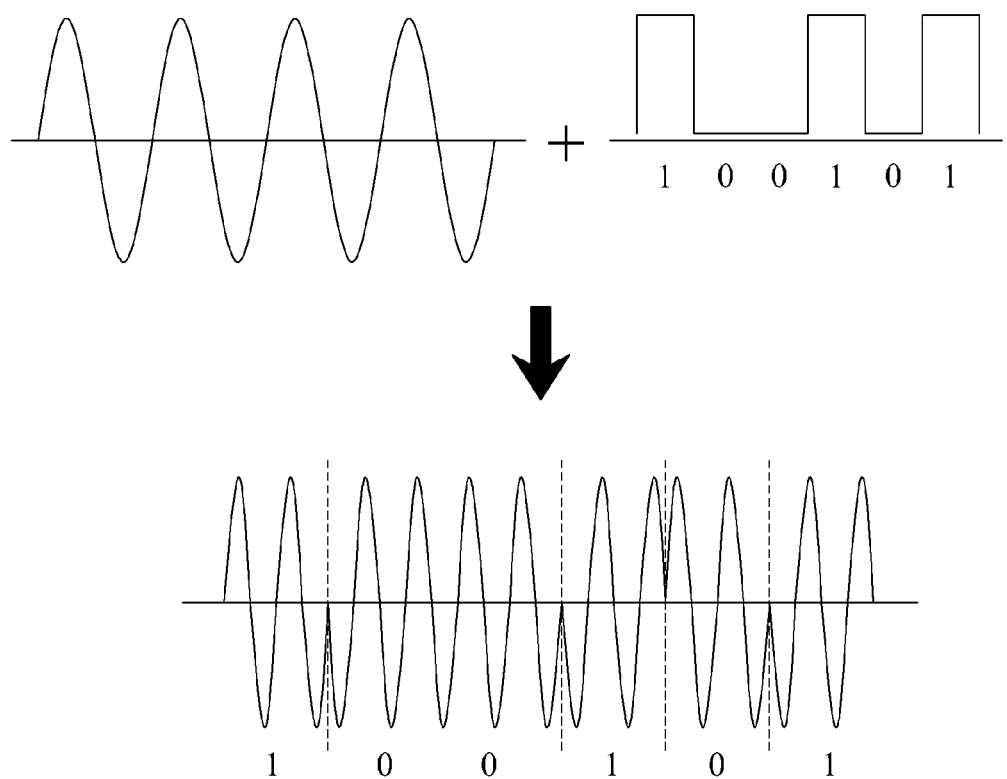
FIG. 7 is a diagram illustrating another example of an output waveform of a modulator of a resonate power generator.

FIG. 7 illustrates another example of an output waveform of a modulator of a resonate power generator.

Referring to FIG. 7, a binary phase shift keying (BPSK) modulated signal may be obtained by mixing a bit stream, for example, '100101', based on a phase control scheme of FIG. 5. The modulated signal of FIG. 7 may be demodulated into an original bit stream through a circuit that may demodulate a phase controlled modulated signal (the BPSK modulated signal). The resonate power generator 200 or the resonate power receiver 250 that receives the demodulated original bit stream may interpret a bit value of the corresponding bit stream to perform a predetermined operation.

According to various example embodiments, there may be provided a resonate power generator that may transmit information to the resonate power receiver and may receive information from the resonate power receiver.

According to various example embodiments, there may be provided a resonate power receiver that may transmit information to the resonate power generator and may receive information from the resonate power generator.

According to various example embodiments, there may be provided a resonate power generator and a resonate power receiver that may modulate desired information to transmit the modulated information to a power carrier signal, and that may demodulate the modulated information.

According to various example embodiments, there may be provided a system that may include a simple modulator and demodulator in the resonate power generator and the resonate power receiver, and thus may perform a bidirectional communication.

A source resonator and/or a target resonator may be configured, for example, as a helix coil structured resonator, a spiral coil structured resonator, a meta-structured resonator, and the like.

Hereinafter, a number of related terms will be described for concise understanding. Materials may have a unique magnetic permeability, i.e., Mu, and a unique permittivity, i.e., epsilon. The magnetic permeability indicates a ratio between a magnetic flux density occurring with respect to a given magnetic field in a corresponding material and a magnetic flux density occurring with respect to the given magnetic field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. In particular, a material having a magnetic permeability or a permittivity absent in nature and being artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 8:
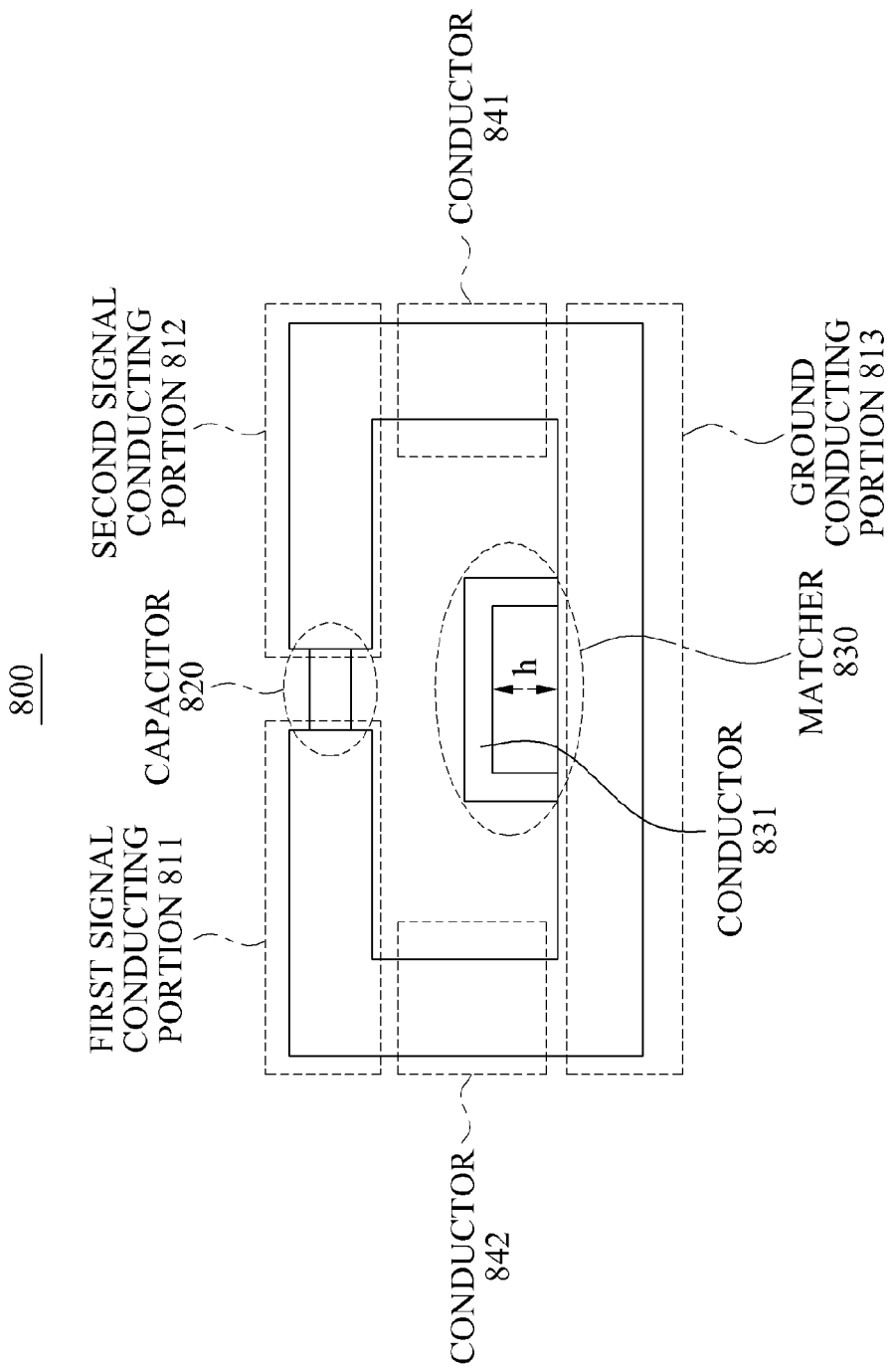
FIG. 8 is a two-dimensional illustration of an example of a resonator structure.

FIG. 8 is a two-dimensional (2D) illustration of an example of a resonator 800 structure.

Referring to FIG. 8, the resonator 800 may include a transmission line, a capacitor 820, a matcher 830, and conductors 841 and 842. The transmission line may include a first signal conducting portion 811, a second signal conducting portion 812, and a ground conducting portion 813.

The capacitor 820 may be inserted in series between the first signal conducting portion 811 and the second signal conducting portion 812, whereby an electric field may be confined within the capacitor 820. Generally, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. Herein, a conductor disposed in an upper portion of the transmission line may be separated and thereby referred to as the first signal conducting portion 811 and the second signal conducting portion 812. A conductor disposed in the lower portion of the transmission line may be referred to as the ground conducting portion 813.

As illustrated in FIG. 8, the transmission line may include the first signal conducting portion 811 and the second signal conducting portion 812 in the upper portion of the transmission line, and may include the ground conducting portion 813 in the lower portion of the transmission line. The first signal conducting portion 811 and the second signal conducting portion 812 may be disposed to face the ground conducting portion 813. The current may flow through the first signal conducting portion 811 and the second signal conducting portion 812.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, whereby the resonator 800 may have an electrically closed-loop structure. The term "loop structure" may include a polygonal structure, for example, a circular structure, a rectangular structure, and the like. "Having a loop structure" may indicate being electrically closed.

The capacitor 820 may be inserted into an intermediate portion of the transmission line. For example, the capacitor 820 may be inserted into a space between the first signal conducting portion 811 and the second signal conducting portion 812. The capacitor 820 may have a shape of a lumped element, a distributed element, and the like. For example, a distributed capacitor having the shape of the distributed element may include zigzagged conductor lines and a dielectric material having a relatively high permittivity between the zigzagged conductor lines.

In an example in which the capacitor 820 is inserted into the transmission line, the resonator 800 may have a property of a metamaterial. The metamaterial indicates a material having a predetermined electrical property that cannot be discovered in nature, and thus may have an artificially designed structure. An electromagnetic characteristic of materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus the corresponding materials may be referred to as right handed materials (RHMs). However, the metamaterial has a magnetic permeability or a permittivity absent in nature, and thus may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

In an example in which a capacitance of the capacitor 820 inserted as the lumped element is appropriately determined, the resonator 800 may have the characteristic of the metamaterial. Since the resonator 800 may have a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include a criterion to enable the resonator 800 to have the characteristic of the metamaterial, a criterion to enable the resonator 800 to have a negative magnetic permeability in a target frequency, a criterion to enable the resonator 800 to have a zeroth order resonance characteristic in the target frequency, and the like. Based on at least one criterion among the aforementioned criteria, the capacitance of the capacitor 820 may be determined.

The resonator 800, also referred to as the MNG resonator 800, may have a zeroth order resonance characteristic of having, as a resonance frequency, a frequency when a propagation constant is "0". Since the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not need to be changed in order to change the resonance frequency.

In a near field, the electric field may be concentrated on the capacitor 820 inserted into the transmission line. Accordingly, due to the capacitor 820, the magnetic field may become dominant in the near field. The MNG resonator 800 may have a relatively high Q-factor using the capacitor 820 of the lumped element and thus, it is possible to enhance an efficiency of power transmission. In such an example, the Q-factor indicates a level of an ohmic loss or a ratio of a reactance with respect to a resistance in the wireless power transmission. It can be understood that the efficiency of the wireless power transmission may increase according to an increase in the Q-factor.

The MNG resonator 800 may include the matcher 830 to be used in impedance matching. The matcher 830 may appropriately adjust a strength of a magnetic field of the MNG resonator 800. An impedance of the MNG resonator 800 may be determined by the matcher 830. A current may flow in the MNG resonator 800 via a connector, or may flow out from the MNG resonator 800 via the connector. The connector may be connected to the ground conducting portion 813 or the matcher 830. The power may be transferred through coupling without using a physical connection between the connector and the ground conducting portion 813 or the matcher 830.

More specifically, as illustrated in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include a conductor 831 to be used in the impedance matching in a location separate from the ground conducting portion 813 by a distance h. The impedance of the resonator 800 may be changed by adjusting the distance h.

Although not illustrated in FIG. 8, a controller may be provided to control the matcher 830. In this example, the matcher 830 may change the physical shape of the matcher 830 based on a control signal generated by the controller. For example, the distance h between the conductor 831 of the matcher 830 and the ground conducting portion 813 may be increased or decreased based on the control signal. Accordingly, the physical shape of the matcher 830 may be changed whereby the impedance of the resonator 800 may be adjusted. The controller may generate the control signal based on various factors, which will be described later.

As illustrated in FIG. 8, the matcher 830 may be configured as a passive element such as the conductor 831. Depending on various example embodiments, the matcher 830 may be configured as an active element such as a diode, a transistor, and the like. In an example in which the active element is included in the matcher 830, the active element may be driven based on the control signal generated by the controller, and the impedance of the resonator 800 may be adjusted based on the control signal. For example, a diode that is a type of the active element may be included in the matcher 830. The impedance of the resonator 800 may be adjusted depending on whether the diode is in an on state or in an off state.

Although not illustrated in FIG. 8, a magnetic core may be further provided to pass through the MNG resonator 800. The magnetic core may perform a function of increasing a power transmission distance.

Figure 9:
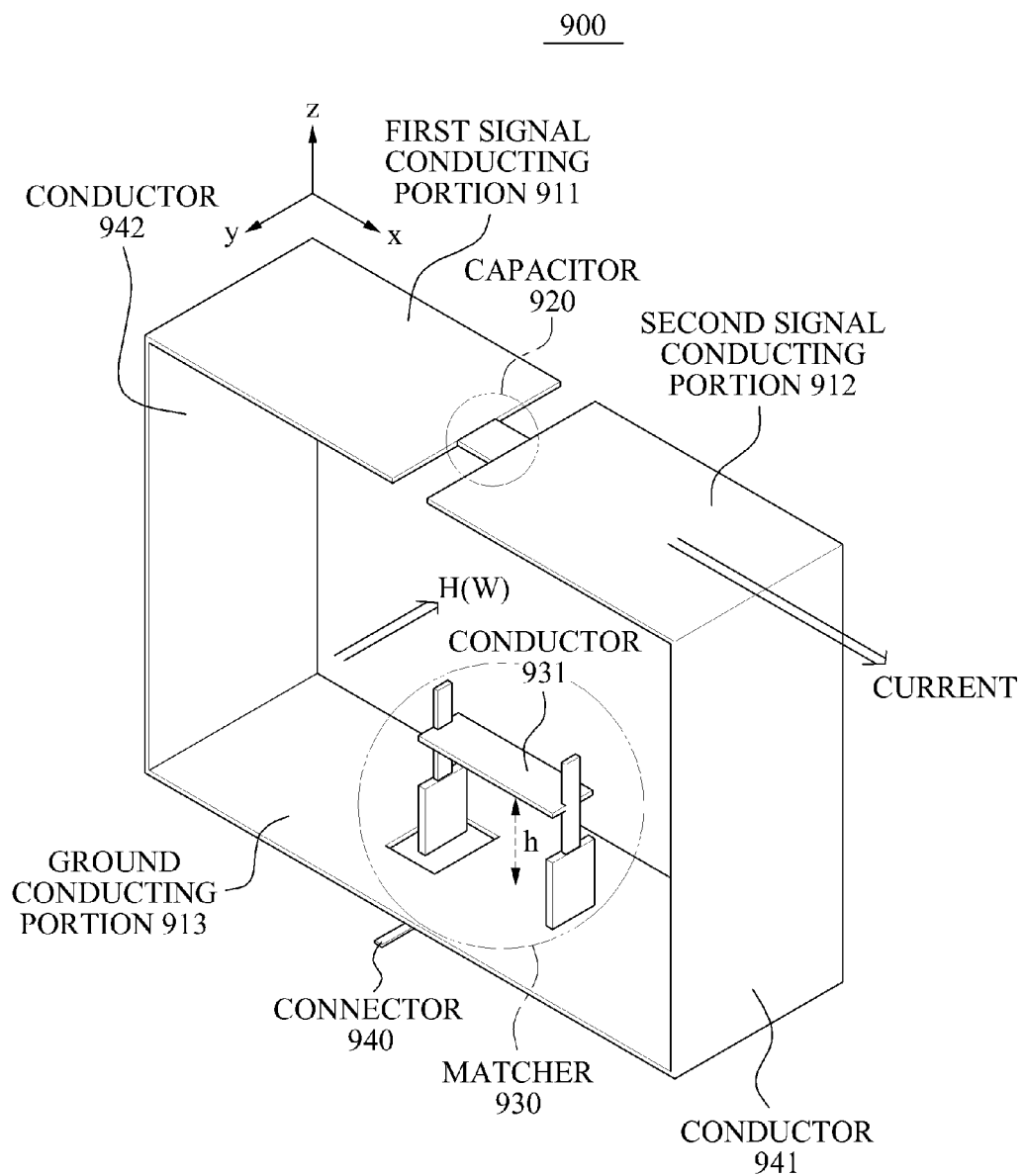
FIG. 9 is a three-dimensional illustration of an example of a resonator structure.

FIG. 9 is a three-dimensional illustration of an example of a resonator 900 structure.

Referring to FIG. 9, the resonator 900 may include a transmission line and a capacitor 920. The transmission line may include a first signal conducting portion 911, a second signal conducting portion 912, and a ground conducting portion 913. The capacitor 920 may be inserted in series between the first signal conducting portion 911 and the second signal conducting portion 912 of the transmission link, whereby an electric field may be confined within the capacitor 920.

As illustrated in FIG. 9, the transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. A current may flow in an x direction through the first signal conducting portion 911 and the second signal conducting portion 912. Due to the current, a magnetic field H(W) may be formed in a −y direction. Alternatively, unlike the diagram of FIG. 9, the magnetic field H(W) may be formed in a +y direction.

One end of the first signal conducting portion 911 may be shorted to the conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. The term "loop structure" may include a polygonal structure, for example, a circular structure, a rectangular structure, and the like. "Having a loop structure" may indicate being electrically closed.

As illustrated in FIG. 9, the capacitor 920 may be inserted between the first signal conducting portion 911 and the second signal conducting portion 912. The capacitor 920 may be inserted into a space between the first signal conducting portion 911 and the second signal conducting portion 912. The capacitor 920 may have a shape of a lumped element, a distributed element, and the like. For example, a distributed capacitor having the shape of the distributed element may include zigzagged conductor lines and a dielectric material having a relatively high permittivity between the zigzagged conductor lines.

As the capacitor 920 is inserted into the transmission line, the resonator 900 may have a property of a metamaterial.

In a case in which a capacitance of the capacitor inserted as the lumped element is appropriately determined, the resonator 900 may have the characteristic of the metamaterial. Since the resonator 900 may have a negative magnetic permeability by appropriately adjusting the capacitance of the capacitor 920, the resonator 900 may also be referred to as an MNG resonator. Various criteria may be applied to determine the capacitance of the capacitor 920. For example, the various criteria may include a criterion to enable the resonator 900 to have the characteristic of the metamaterial, a criterion to enable the resonator 900 to have a negative magnetic permeability in a target frequency, a criterion to enable the resonator 900 to have a zeroth order resonance characteristic in the target frequency, and the like. Based on at least one criterion among the aforementioned criteria, the capacitance of the capacitor 920 may be determined.

The resonator 900, also referred to as the MNG resonator 900, may have a zeroth order resonance characteristic of having, as a resonance frequency, a frequency when a propagation constant is "0". Since the resonator 900 may have the zeroth order resonance characteristic, the resonance frequency may be independent with respect to a physical size of the MNG resonator 900. By appropriately designing the capacitor 920, the MNG resonator 900 may sufficiently change the resonance frequency. Accordingly, the physical size of the MNG resonator 900 may not be changed.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. More particularly, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include the matcher 930 to be used in impedance matching. The matcher 930 may appropriately adjust the strength of magnetic field of the MNG resonator 900. An impedance of the MNG resonator 900 may be determined by the matcher 930. A current may flow in the MNG resonator 900 via a connector 940, or may flow out from the MNG resonator 900 via the connector 940. The connector 940 may be connected to the ground conducting portion 913 or the matcher 930.

More specifically, as illustrated in FIG. 9, the matcher 930 may be positioned within the loop formed by the loop structure of the resonator 900. The matcher 930 may adjust the impedance of the resonator 900 by changing the physical shape of the matcher 930. For example, the matcher 930 may include the conductor 931 to be used in the impedance matching in a location separate from the ground conducting portion 913 by a distance h. The impedance of the resonator 900 may be changed by adjusting the distance h.

Although not illustrated in FIG. 9, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed whereby the impedance of the resonator 900 may be adjusted. The distance h between the conductor 931 of the matcher 930 and the ground conducting portion 913 may be adjusted using a variety of schemes. As one example, a plurality of conductors may be included in the matcher 930 and the distance h may be adjusted by adaptively activating one of the conductors. As another example, the distance h may be adjusted by adjusting the physical location of the conductor 931 up and down. The distance h may be controlled based on the control signal of the controller. The controller may generate the control signal using various factors. An example of such a controller generating the control signal will be described later.

As illustrated in FIG. 9, the matcher 930 may be configured as a passive element such as the conductor 931. According to various example embodiments, the matcher 930 may be configured as an active element such as a diode, a transistor, and the like. In an example in which the active element is included in the matcher 930, the active element may be driven based on the control signal generated by the controller, and the impedance of the resonator 900 may be adjusted based on the control signal. For example, a diode that is a type of the active element may be included in the matcher 930. The impedance of the resonator 900 may be adjusted depending on whether the diode is in an on state or in an off state.

Although not illustrated in FIG. 9, a magnetic core may be further provided to pass through the resonator 900 configured as the MNG resonator. The magnetic core may perform a function of increasing a power transmission distance.

Figure 10:
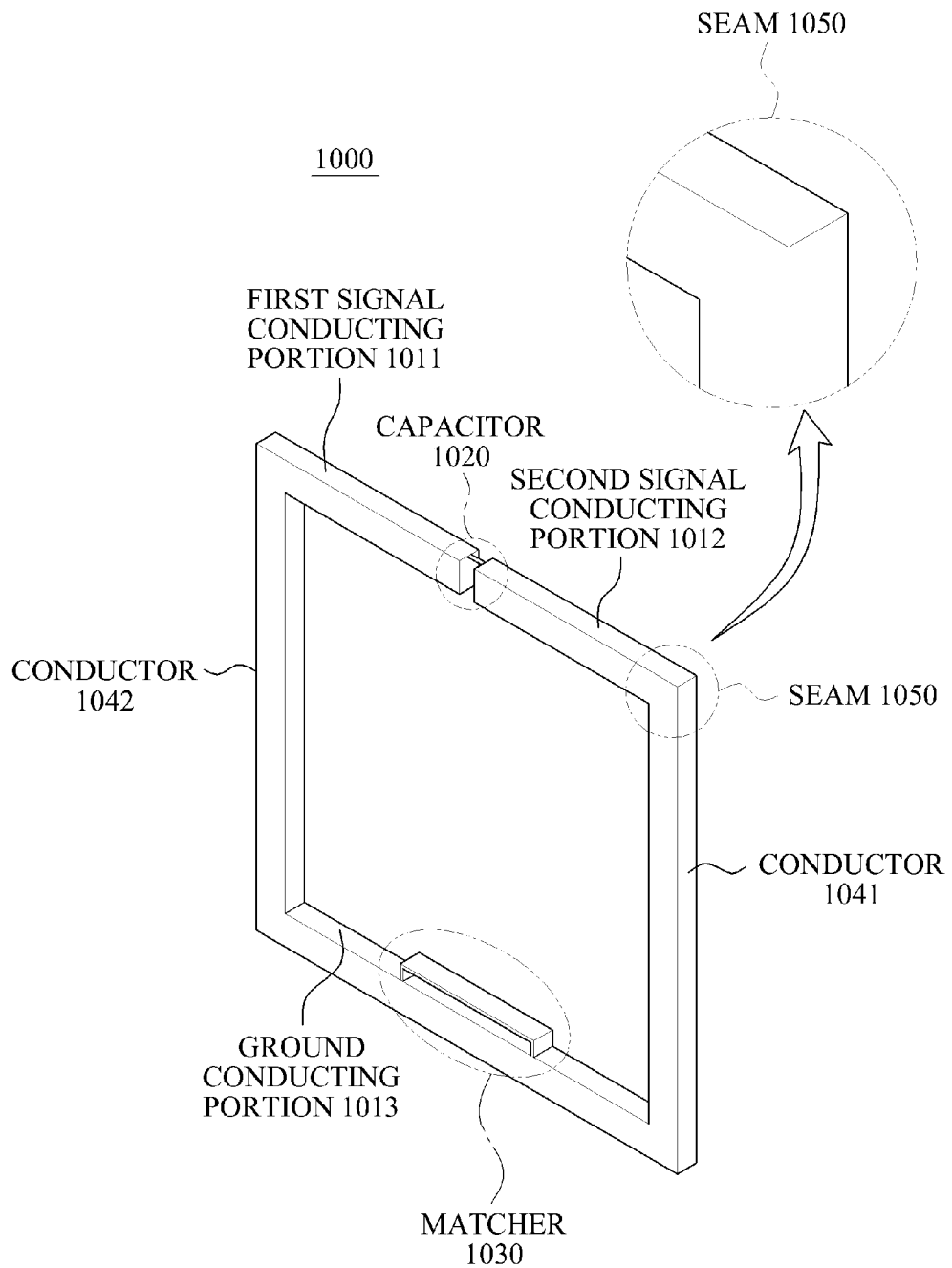
FIG. 10 illustrates an example of a resonator for a wireless power transmission configured as a bulky type.

FIG. 10 illustrates an example of a resonator 1000 for a wireless power transmission configured as a bulky type.

Referring to FIG. 10, a first signal conducting portion 1011 and a conductor 1042 may be integrally formed, rather than being separately manufactured, and thereby may be connected to each other. Similarly, a second signal conducting portion 1012 and a conductor 1041 may also be integrally manufactured.

In an example in which the second signal conducting portion 1012 and the conductor 1041 are separately manufactured and then are connected to each other, a loss of conduction may occur due to a seam 1050. The second signal conducting portion 1012 and the conductor 1041 may be connected to each other without using a separate seam, that is, may be seamlessly connected to each other. Accordingly, it is possible to decrease a conductor loss caused by the seam 1050. Accordingly, the second signal conducting portion 1012 and the ground conducting portion 1013 may be seamlessly and integrally manufactured. Similarly, the first signal conducting portion 1011 and the ground conducting portion 1013 may be seamlessly and integrally manufactured.

Referring to FIG. 10, a type of a seamless connection connecting at least two partitions into an integrated form is referred to as a bulky type.

Figure 11:
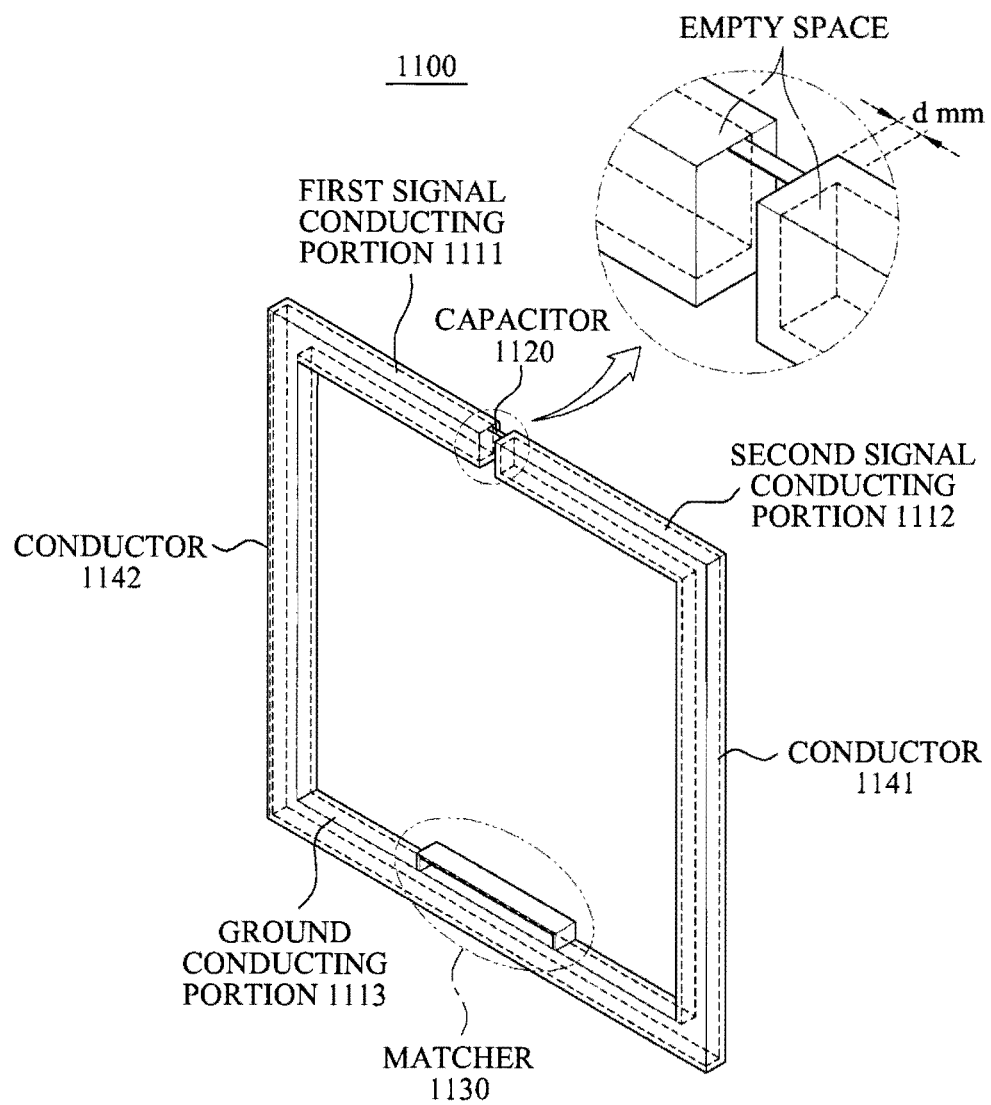
FIG. 11 illustrates an example of a resonator for a wireless power transmission, configured as a hollow type.

FIG. 11 illustrates an example of a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type may include an empty space inside.

In a given resonance frequency, an active current may be modeled to flow in only a portion of the first signal conducting portion 1111 instead of all of the first signal conducting portion 1111, a portion of the second signal conducting portion 1112 instead of all of the second signal conducting portion 1112, a portion of the ground conducting portion 1113 instead of all of the ground conducting portion 1113, and portions of the conductors 1141 and 1142 instead of all of the conductors 1141 and 1142. More specifically, in an example in which a depth of each of the first signal conducting portion 1111, the second signal conducting portion 1112, the ground conducting portion 1113, and the conductors 1141 and 1142 is significantly deeper than a corresponding skin depth in the given resonance frequency, such a structure may be ineffective. The significantly deeper depth may increase a weight or manufacturing costs of the resonator 1100.

Accordingly, in the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. In an example in which each of the first signal conducting portion 1111, the second signal conducting portion 1112, the ground conducting portion 1113, and the conductors 1141 and 1142 has an appropriate depth deeper than a corresponding skin depth, the resonator 1100 may be manufactured to be lighter, and manufacturing costs of the resonator 1100 may also decrease.

For example, as illustrated in FIG. 11, the depth of the second signal conducting portion 1112 may be determined as "d" mm and d may be determined according to $$d = \frac{1}{\sqrt{\pi f \mu \sigma}}.$$

Here, f denotes a frequency, $\mu$ denotes a magnetic permeability, and $\sigma$ denotes a conductor constant. In an example in which the first signal conducting portion 1111, the second signal conducting portion 1112, the ground conducting portion 1113, and the conductors 1141 and 1142 are made of a copper and have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

Figure 12:
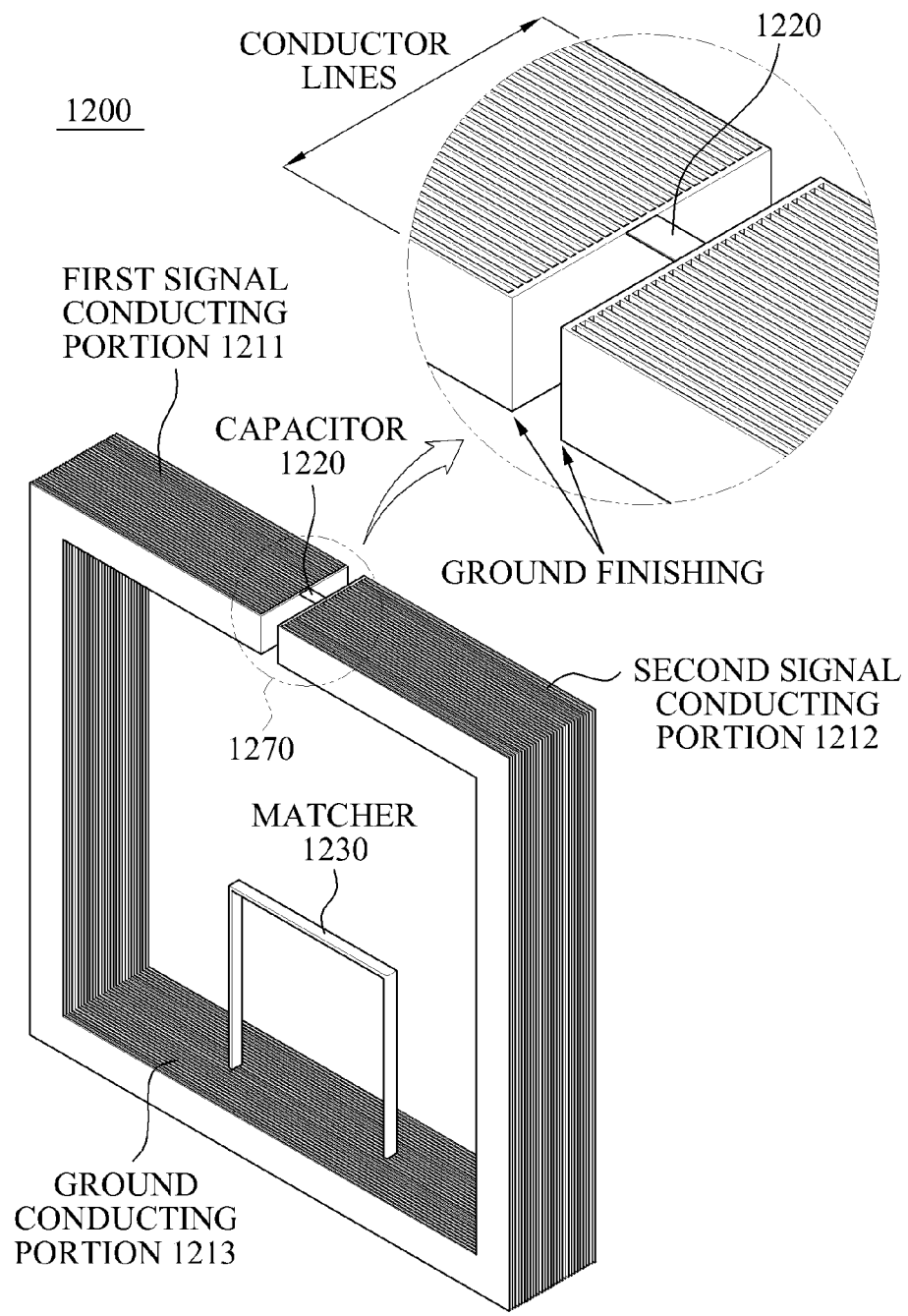
FIG. 12 illustrates an example of a resonator for a wireless power transmission using a parallel-sheet configuration.

FIG. 12 illustrates an example of a resonator 1200 for a wireless power transmission using a parallel-sheet configuration.

Referring to FIG. 12, the parallel-sheet configuration may be applicable to each of a first signal conducting portion 1211 and a second signal conducting portion 1212 included in the resonator 1200.

Each of the first signal conducting portion 1211 and the second signal conducting portion 1212 may not be a perfect conductor, and thus may have a resistance. Due to the resistance, an ohmic loss may occur. The ohmic loss may decrease a Q-factor and may also decrease a coupling effect.

By applying the parallel-sheet configuration to each of the first signal conducting portion 1211 and the second signal conducting portion 1212, it is possible to decrease the ohmic loss, and to increase the Q-factor and the coupling effect. Referring to a portion 1170 indicated by a circle in FIG. 12, in an example in which the parallel-sheet configuration is applied, each of the first signal conducting portion 1211 and the second signal conducting portion 1212 may include a plurality of conductor lines. The plurality of conductor lines may be disposed in parallel, and may be shorted at an end portion of each of the first signal conducting portion 1211 and the second signal conducting portion 1212.

As described above, in an example in which the parallel-sheet configuration is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

Figure 13:
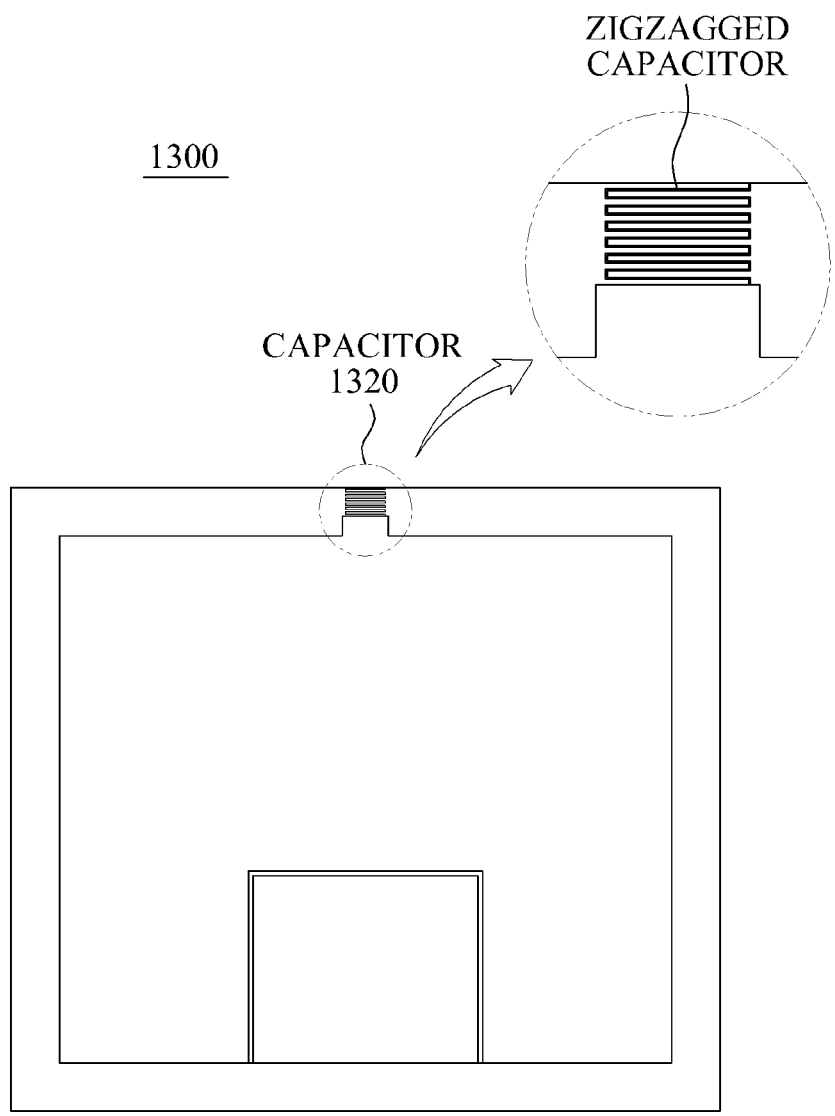
FIG. 13 illustrates an example of a resonator for a wireless power transmission, including a distributed capacitor.

FIG. 13 illustrates an example of a resonator 1300 for a wireless power transmission, including a distributed capacitor.

Referring to FIG. 13, a capacitor 1320 included in the resonator 1300 for the wireless power transmission may be a distributed capacitor. A capacitor as a lumped element may have a relatively high equivalent series resistance (ESR). A variety of schemes have been proposed to decrease the ESR contained in the capacitor of the lumped element. According to an example embodiment, by using the capacitor 1320 as a distributed element, it is possible to decrease the ESR. As is known in the art, a loss caused by the ESR may decrease a Q-factor and a coupling effect.

As illustrated in FIG. 13, the capacitor 1320 as the distributed element may have a zigzagged structure. For example, the capacitor 1320 as the distributed element may be configured as a conductive line and a conductor having the zigzagged structure.

As illustrated in FIG. 13, by employing the capacitor 1320 as the distributed element, it is possible to decrease the loss occurring due to the ESR. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF instead of using a single capacitor of 10 pF, it is possible to decrease the loss occurring due to the ESR.

Figure 14A:
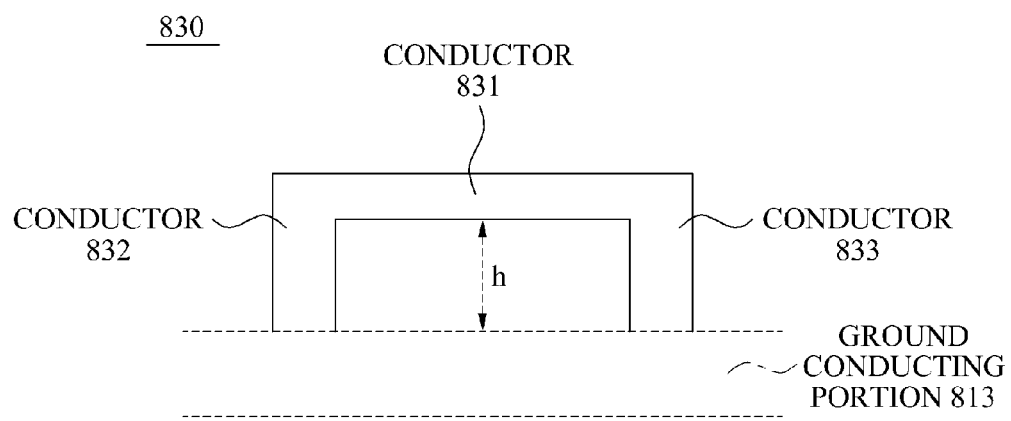
FIG. 14A illustrates an example of the matcher used in the resonator illustrated in FIG. 8.
Figure 14B:
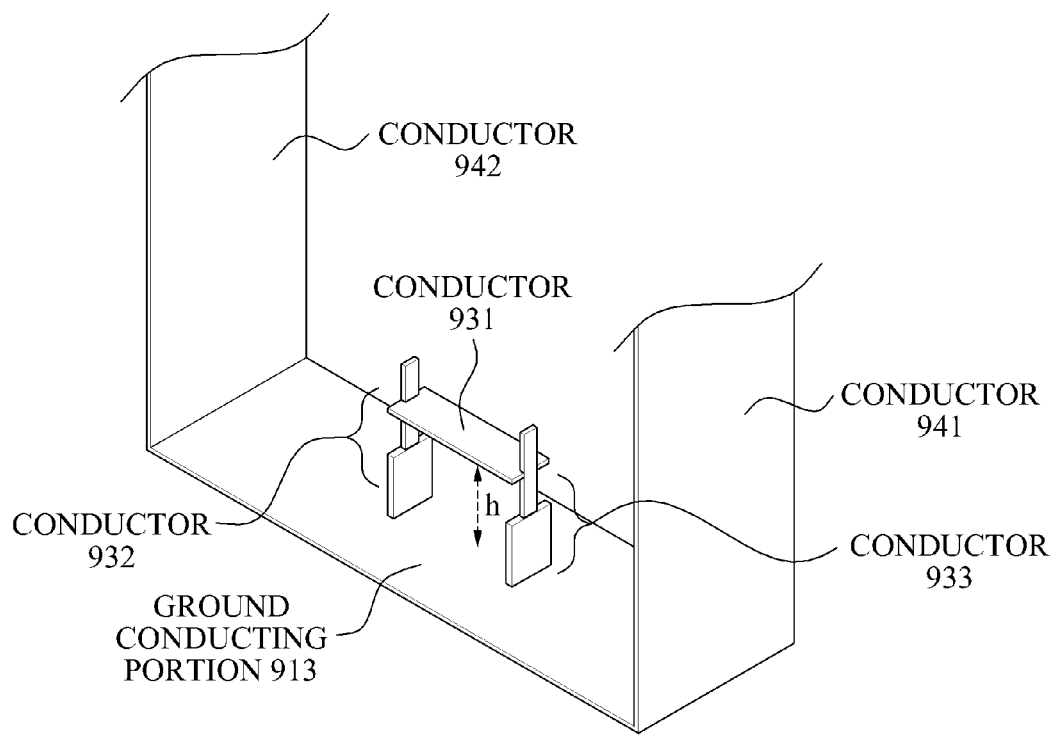
FIG. 14B illustrates an example of the matcher used in the resonator illustrated in FIG. 9.

FIG. 14A illustrates an example of the matcher 830 used in the resonator 800 illustrated in FIG. 8, and FIG. 14B illustrates an example of the matcher 930 used in the resonator 900 illustrated in FIG. 9.

More specifically, FIG. 14A illustrates a portion of the resonator of FIG. 6 including the matcher 830, and FIG. 14B illustrates a portion of the resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Referring to FIG. 14B, the matcher 930 may include the conductor 931, a conductor 932, and a conductor 933. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller. Similar to the matcher 830 illustrated in FIG. 12A, in the matcher 930 the distance h between the conductor 931 and the ground conducting portion 913 may be adjusted using a variety of schemes. For example, the variety of schemes may include a scheme of adjusting the distance h by adaptively activating one of the conductors 831, 832, and 833, a scheme of adjusting the physical location of the conductor 931 up and down, and the like.

Although not illustrated in FIGS. 14A and 14B, the matcher may include an active element. A scheme of adjusting an impedance of a resonator using the active element may be similar to the examples described above. For example, the impedance of the resonator may be adjusted by changing a path of a current flowing through the matcher using the active element.

Figure 15:
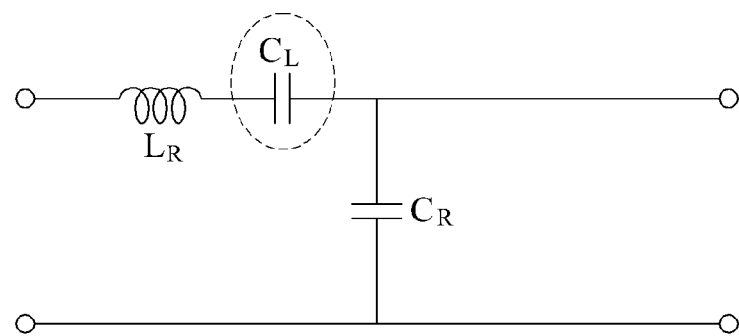
FIG. 15 is a diagram illustrating an example of an equivalent circuit of the resonator for a wireless power transmission of FIG. 8.

FIG. 15 illustrates an example of an equivalent circuit of the resonator 800 of FIG. 8.

The resonator 800 used in a wireless power transmission may be modeled to the equivalent circuit of FIG. 15. In the equivalent circuit of FIG. 15, $C_L$ denotes a capacitor that is inserted in a form of a lumped element in the middle of the transmission line of FIG. 8.

Here, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad [\text{Equation 2}]$$

In Equation 2, MZR denotes a Mu zero resonator.

Referring to Equation 2, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonate power generator comprising:
  a modulator/demodulator configured to control modulation of transmission data transmitted to a target resonator, to control transmission of the modulated transmission data on a power carrier signal of a source resonator, and to demodulate received data received from the target resonator; and
  a coupling unit configured to couple the modulator/demodulator and the source resonator, wherein
  the modulator/demodulator comprises a first switch, a second switch, a mixer, and a modulating switch,
  each of the first switch the second switch is configured to switch between a first state for a modulation and a second state for a demodulation such that:
    when the first switch is in the first state, the first switch connects the coupling unit and the modulating switch to transfer the power carrier signal to the modulating switch,
    when the first switch is in the second state, the first switch connects the coupling unit and the mixer to transfer the power carrier signal to the mixer, when the second switch is in the first state, the second switch connects the coupling unit and the modulating switch to transfer the modulated transmission data to the source resonator, and when the second switch is in the second state, the second switch connects the coupling unit and the mixer to transfer the received data to the mixer, and the modulating switch is configured to modulate the transmission data on the power carrier signal.

2. The resonate power generator of claim 1, wherein
the mixer is configured to mix the received data and the power carrier signal; and
the modulator/demodulator further comprises an analog to digital (A/D) converter configured to convert an output signal of the mixer so as to reproduce a bit value transmitted from the target resonator.

3. The resonate power generator of claim 1, wherein the modulator/demodulator further comprises:
an envelope detector configured to detect an envelope of the received data, wherein
the resonate power generator compares an output signal of the envelope detector and the power carrier signal to reproduce a bit value transmitted from the target resonator.

4. The resonate power generator of claim 1, further comprising:
the source resonator configured to transmit the modulated data to the target resonator.

5. The resonate power generator of claim 1, further comprising:
a controller configured to control the modulating switch based or the transmission data.

6. The resonate power generator of claim 5, wherein the demodulated data is sent to the controller to be used in a predetermined operation.

7. A resonate power generator comprising:
a modulator/demodulator configured to control modulation of transmission data transmitted to a target resonator, to control transmission of the modulated transmission data on a power carrier signal of a source resonator, and to demodulate received data received from the target resonator; and
a coupling unit configured to couple the modulator/demodulator and the source resonator, wherein
the modulator/demodulator comprises a first switch, a second switch, a first mixer, and a modulation unit, the modulation unit comprising a second mixer, a third mixer, and a phase control unit,
each of the first switch and the second switch is configured to switch between a first state for a modulation and a second state for a demodulation such that:
when the first switch is in the first state, the first switch connects that coupling unit and the modulation unit to transfer the power carrier signal to the modulation unit,
when the first switch is in the second state, the first switch connects the coupling unit and the first mixer to transfer the power carrier signal to the first mixer,
when the second switch is in the first state, the second switch connects the coupling unit and the first mixer to transfer the received data to the first mixer, the phase control unit is configured to divide the power carrier signal into a first signal having a first phase and a second signal having a second phase,
the second mixer is configured to modulate the transmission data on the first signal, and the third mixer is configured to modulate the transmission data on the second signal.

8. A resonate power transceiver comprising:
a modulator/demodulator configured to control modulation of transmission data transmitted to another resonate power transceiver, to control transmission of the modulated transmission data on a power carrier signal of a resonator, and to demodulate received data received from the another resonate power transceiver; and
a coupling unit configured to couple the modulator/demodulator and the resonator, wherein
the modulator/demodulator comprises a first switch, a second switch, a mixer, and a modulation unit,
each of the first switch and the second switch is configured to switch between a first state for a modulation and a second state for a demodulation such that:
when the first switch is in the first state, the first switch connects the coupling unit and the modulation unit to transfer the power carrier signal to the modulation unit,
when the first switch is in the second state, the first switch connects the coupling unit and the mixer to transfer the power carrier signal to the mixer,
when the second switch is in the first state, the second switch connects the coupling unit and the modulation unit to transfer the modulated transmission data to the resonator, and
when the second switch is in the second state, the second switch connects the coupling unit and the mixer to transfer the received data to the mixer, and
the modulation unit is configured to modulate the transmission data on the power carrier signal.

9. The resonate power transceiver of claim 8, wherein
the mixer is configured to mix the received data and the power carrier signal; and
the modulator/demodulator further comprises an analog to digital (A/D) converter configured to convert an output signal of the mixer so as to reproduce a bit value transmitted from the another resonate power transceiver.

10. The resonate power transceiver of claim 8, wherein the modulator/demodulator further comprises:
an envelope detector configured to detect an envelope of the received data, wherein
the resonate power receiver compares an output signal of the envelope detector and the power carrier signal, to reproduce a bit value transmitted from the another resonate power transceiver.

11. The resonate power transceiver of claim 8, wherein the modulation unit comprises:
a phase control unit configured to shift a phase of the power carrier signal; and
a modulating mixer configured to mix an output of the phase control unit and a bit stream corresponding to the transmission data.

* * * * *